US007797937B2

(12) United States Patent
Endicott et al.

(10) Patent No.: US 7,797,937 B2
(45) Date of Patent: Sep. 21, 2010

(54) EGR EQUIPPED ENGINE HAVING CONDENSATION DISPERSION DEVICE

(75) Inventors: Dennis Lee Endicott, Hanna City, IL (US); David Richard Wisley, Peoria, IL (US); James Richard Weber, Lacon, IL (US); Ben Evans, Peoria, IL (US); Stephan D. Roozenboom, Washington, IL (US); Michael Patrick Harmon, Dunlap, IL (US); Isaac Ethan Fox, East Peoria, IL (US); James Dean Dunbar, Washington, IL (US)

(73) Assignee: Caterpillar Inc, Peoria, IL (US)

( * ) Notice: Subject to any disclaimer, the term of this patent is extended or adjusted under 35 U.S.C. 154(b) by 469 days.

(21) Appl. No.: 11/819,877

(22) Filed: Jun. 29, 2007

(65) Prior Publication Data

US 2009/0000283 A1 Jan. 1, 2009

(51) Int. Cl.
*F02B 33/44* (2006.01)
*F02B 31/00* (2006.01)
*F02M 25/07* (2006.01)
*F02M 29/00* (2006.01)
*F01N 3/10* (2006.01)
*F01N 3/02* (2006.01)
*B01D 47/06* (2006.01)

(52) U.S. Cl. ....................... 60/605.1; 60/605.2; 60/307; 60/309; 123/306; 123/568.12; 123/568.18; 123/590; 261/78.1

(58) Field of Classification Search ................ 60/605.2, 60/307–309; 123/568.12, 568.18, 306, 590–593; 261/78.1
See application file for complete search history.

(56) References Cited

U.S. PATENT DOCUMENTS

| | | | | |
|---|---|---|---|---|
| 1,152,381 | A * | 8/1915 | Kenney | 181/261 |
| 1,709,333 | A * | 4/1929 | Webb, Sr. | 181/259 |
| 3,512,511 | A | 5/1970 | Rappolt | 261/78.1 |
| 3,930,485 | A | 1/1976 | Konomi | 123/590 |
| 3,964,875 | A * | 6/1976 | Chang et al. | 422/176 |
| 4,053,141 | A * | 10/1977 | Gussefeld | 366/339 |
| 4,146,596 | A | 3/1979 | Saito et al. | 261/78.1 |
| 4,274,386 | A | 6/1981 | Reyes | 123/590 |

(Continued)

FOREIGN PATENT DOCUMENTS

GB 2 127 316 A * 4/1984

(Continued)

OTHER PUBLICATIONS

Notice of Allowance from U.S. Appl. No. 11/819,881, mailed Jul. 8, 2008 (7 pages).

(Continued)

*Primary Examiner*—Thai Ba Trieu
(74) *Attorney, Agent, or Firm*—Finnegan, Henderson, Farabow, Garrett & Dunner LLC

(57) ABSTRACT

A condensation dispersion device for use with a power source having an exhaust recirculation system is disclosed. The condensation dispersion device may have a housing with an inlet configured to receive exhaust, and an outlet configured to discharge exhaust. The condensation dispersion device may also have a first static mixing device disposed within the housing and being configured to redirect condensate from an internal wall of the housing into the exhaust.

20 Claims, 4 Drawing Sheets

U.S. PATENT DOCUMENTS

| | | | | |
|---|---|---|---|---|
| 4,294,220 | A | 10/1981 | Yasuhara et al. | 123/568 |
| 4,461,579 | A * | 7/1984 | McCallum | 366/337 |
| 5,542,249 | A * | 8/1996 | Heath | 60/307 |
| 5,685,281 | A | 11/1997 | Li | 123/590 |
| 5,915,354 | A | 6/1999 | Ma | 123/306 |
| 5,916,134 | A * | 6/1999 | Yang et al. | 60/299 |
| 5,941,069 | A * | 8/1999 | Heath | 60/307 |
| 6,027,241 | A * | 2/2000 | King | 366/181.5 |
| 6,044,827 | A | 4/2000 | Pfaff et al. | 123/568.18 |
| 6,047,956 | A | 4/2000 | Brazina | 261/78.1 |
| 6,145,498 | A | 11/2000 | Packard et al. | 123/563 |
| 6,158,412 | A * | 12/2000 | Kim | 123/306 |
| 6,536,420 | B1 | 3/2003 | Cheng | 123/590 |
| 6,745,562 | B2 * | 6/2004 | Berriman et al. | 60/309 |
| 6,748,741 | B2 | 6/2004 | Martin et al. | 60/605.2 |
| 6,748,921 | B1 | 6/2004 | Surges | 123/306 |
| 6,796,296 | B2 | 9/2004 | Kim | 123/590 |
| 6,901,907 | B2 | 6/2005 | Wijaya | 123/306 |
| 6,928,979 | B2 | 8/2005 | Chen | 123/306 |
| 6,932,049 | B2 | 8/2005 | Kim | 123/306 |
| 7,008,644 | B2 * | 3/2006 | Batycky et al. | 424/489 |
| 7,028,663 | B1 | 4/2006 | Kim | 123/306 |
| 7,104,251 | B2 | 9/2006 | Kim | 123/306 |
| 7,185,626 | B2 | 3/2007 | Huckelberry et al. | 123/306 |
| 7,416,573 | B2 * | 8/2008 | Lindgren et al. | 55/315 |
| 7,533,520 | B2 * | 5/2009 | Cheng et al. | 60/286 |
| 2002/0185117 | A1 | 12/2002 | Algeri | 123/590 |
| 2003/0037774 | A1 | 2/2003 | Schweinzer et al. | 123/568.12 |
| 2003/0114978 | A1 | 6/2003 | Rimnac et al. | 123/568.12 |
| 2003/0222364 | A1 * | 12/2003 | Jackson et al. | 514/1 |
| 2004/0006978 | A1 | 1/2004 | Beck et al. | 60/280 |
| 2004/0079079 | A1 | 4/2004 | Martin | 60/605.2 |
| 2006/0185364 | A1 | 8/2006 | Chalgren et al. | 60/599 |
| 2006/0225697 | A1 | 10/2006 | Huckelberry et al. | 123/306 |
| 2007/0039322 | A1 | 2/2007 | Bering et al. | 60/605.2 |
| 2007/0056282 | A1 | 3/2007 | Iwaszkiewicz | 60/605.2 |
| 2008/0108554 | A1 * | 5/2008 | Jackson et al. | 514/3 |
| 2009/0000297 | A1 * | 1/2009 | Joergl et al. | 60/605.2 |

FOREIGN PATENT DOCUMENTS

| | | | |
|---|---|---|---|
| WO | WO 2004/013486 | | 12/2004 |
| WO | WO 2007089567 | A1 * | 8/2007 |

OTHER PUBLICATIONS

U.S. Appl. No. 11/819,881, filed Jun. 29, 2007, "Condensation Reduction Device for an EGR Equipped System," pp. 1-18, Figs. 1-3.

http://www.staticmixers.com/default.asp, p. 1.

http://www.tornadofuelsaver.com/272/tornadofuelsaver/howitworks.php, pp. 1-2.

Office Action from U.S. Appl. No. 11/819,881, mailed Mar. 14, 2008 (6 pages).

* cited by examiner

EGR EQUIPPED ENGINE HAVING CONDENSATION DISPERSION DEVICE

TECHNICAL FIELD

The present disclosure relates generally to an exhaust gas recirculation system (EGR) and, more particularly, to an exhaust gas recirculation system having a condensation dispersion device.

BACKGROUND

Internal combustion engines exhaust a complex mixture of air pollutants. These air pollutants are composed of solid particulate matter and gaseous compounds including nitrogen oxides (NOx). Due to increased attention on the environment, exhaust emission standards have become more stringent and the amount of solid particulate matter and gaseous compounds emitted to the atmosphere from an engine is regulated depending on the type of engine, size of engine, and/or class of engine.

One method that has been implemented by engine manufacturers to comply with the regulation of these engine emissions is exhaust gas recirculation (EGR). EGR systems recirculate the exhaust gas by-products into the intake air supply of the internal combustion engine. The recirculated exhaust gas reduces the concentration of oxygen therein, thereby lowering the maximum combustion temperature within the cylinder. The lowered maximum combustion temperature slows the chemical reaction of the combustion process, thereby decreasing the formation of nitrogen oxides. In addition, the particulate matter entrained in the exhaust is burned upon reintroduction into the engine cylinder to further reduce the exhaust gas by-products.

Before the exhaust gas enters the engine cylinders, it must first be mixed with air and cooled to the proper temperature. To cool the mixture of exhaust and charge air, the mixture is directed through a heat exchanger such as an air-to-air heat exchanger. While in the heat exchanger and at locations downstream of the heat exchanger, moisture previously entrained in the exhaust and air mixture condenses on the relatively cool walls of the heat exchanger. Because of the presence of sulfur and nitrogen oxides in the exhaust, the condensate can be corrosive and potentially damaging to the heat exchanger, downstream passageways, and the engine. The condensate may also cause premature wear of the engine due to the condensate's mechanical interactions with the piston, piston rings, and liner as the pistons reciprocate within the cylinders.

One way to minimize the damage caused by condensation is disclosed in U.S. Pat. No. 6,748,741 (the '741 patent) issued to Martin et al. on Jun. 15, 2004. Specifically, the '741 patent discloses a charge air condensation separation system for a turbocharged engine employing EGR. The separation system includes a turbocharger having a compressor providing charge air, with a charge air cooler connected to the compressor to cool the charge air. A charge air delivery duct is connected to an outlet of the charge air cooler, and a toroidal trap having an annular inlet is disposed in the charge air delivery duct. A swirl generator may be used to urge the condensate to flow to the walls of the charge air duct for subsequent trapping. The toroidal trap has a sump for collecting condensation internal to the toroidal trap. A drain line for removing condensation from the sump for expulsion to the atmosphere is connected to the trap, and a pump or other device for overcoming pressure differential in the drain line is employed in certain embodiments.

Although the separation system of the '741 patent may help to minimize damage resulting from condensation-caused acid, it may be limited and result in poor engine emissions. Specifically, although condensate from the charge air may be removed from the system, condensate from the recirculated exhaust may be unrestricted. That is, moisture from the recirculated exhaust flow may still be allowed to condense within the duct work of the engine and, because the separation system only removes condensate from the charge air, the condensed liquid from the recirculated exhaust flow may travel or flow unrestricted into and damage the engine. And, because the acid solution is mainly caused by sulfur compounds and nitrogen oxides in the exhaust flow, the condensate from the exhaust may be more damaging than the condensate from the charge air. Further, it has been shown that the introduction of a well dispersed or atomized (i.e., not condensed) non-combustible fluid into the combustion chamber of an engine during operation may be helpful in reducing the amount of NOx produced by the engine. Thus, because the separation system of the '741 patent removes the fluid from the charge air flow rather than homogeneously redispersing it into the air flow, the NOx production of the engine may be excessive.

The disclosed condensation dispersion device is directed to overcoming one or more of the problems set forth above.

SUMMARY OF THE DISCLOSURE

In one aspect, the present disclosure is directed to a condensation dispersion device. The condensation dispersion device may include a housing having an inlet configured to receive exhaust, and an outlet configured to discharge exhaust. The condensation dispersion device may also include a first static mixing device disposed within the housing. The first static mixing device may be configured to redirect condensate from an internal wall of the housing into the exhaust.

In another aspect, the present disclosure is directed to a method of re-dispersing condensate. The method may include generating a flow of exhaust. The method may also include cooling the flow of exhaust, and redirecting condensate from the cooled flow of exhaust back into the flow of exhaust prior to combustion of the cooled flow of exhaust.

DETAILED DESCRIPTION

Figure 1:
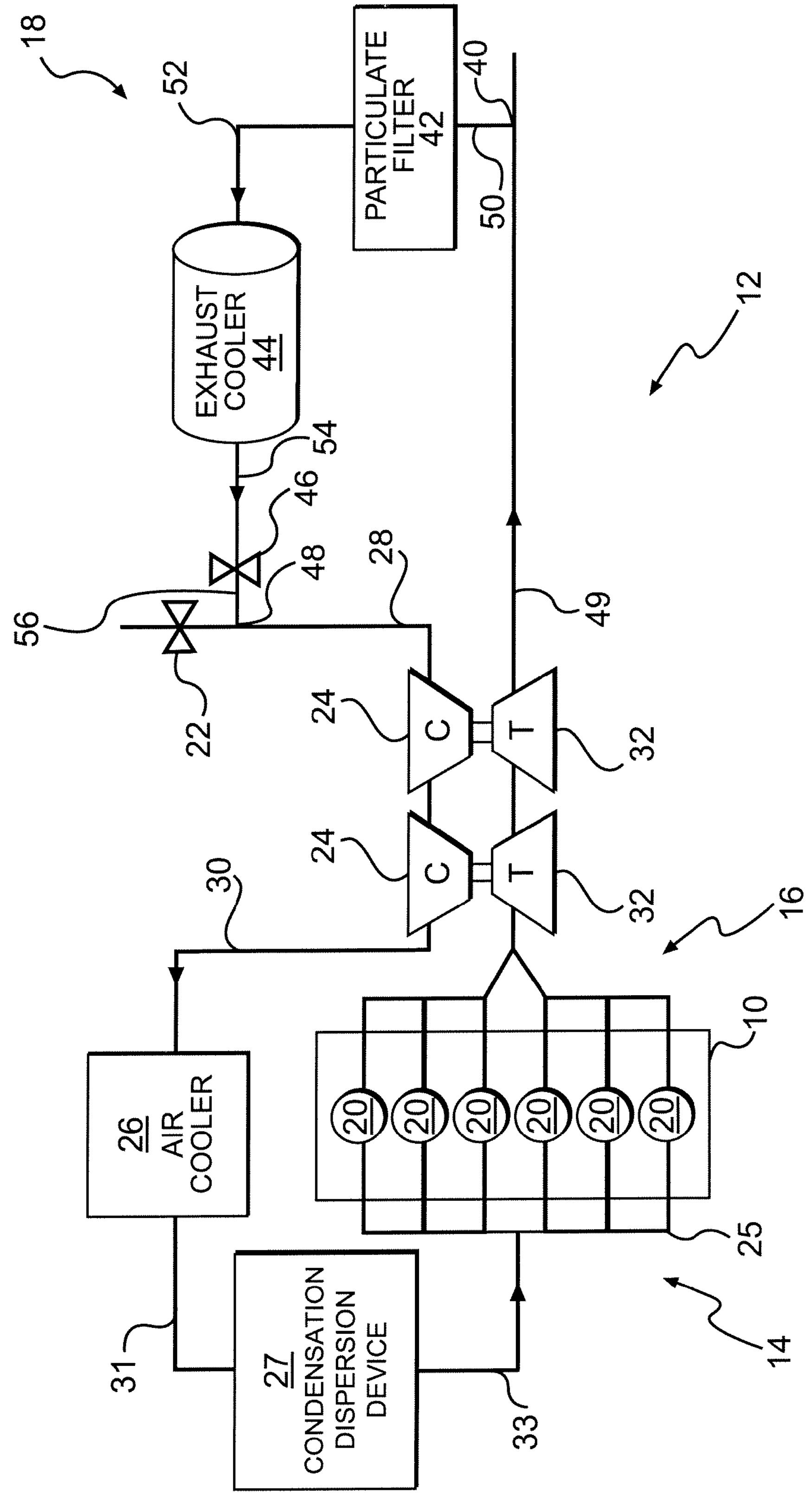
FIG. 1 is a diagrammatic illustration of an exemplary disclosed fluid handling system.

FIG. 1 illustrates an exemplary fluid handling system 12 for use with a power source 10. Power source 10 may include an engine, such as, for example, a diesel engine, a gasoline engine, a gaseous fuel-powered engine, such as a natural gas engine, or any other type of combustion engine apparent to one skilled in the art. It is also considered that power source 10 may alternatively include a furnace or similar non-engine device. Fluid handling system 12 may direct air into and exhaust away from power source 10, and may include an exhaust system 16, an EGR system 18, and an air induction system 14.

Exhaust system 16 may include a means for directing exhaust flow out of power source 10. For example, exhaust system 16 may include one or more turbines 32 fluidly communicated in a series relationship. Each turbine 32 may be connected to one or more compressors 24 of air induction system 14 to drive the connected compressor 24. In particular, as the hot exhaust gases exiting power source 10 expand against blades (not shown) of turbine 32, turbine 32 may rotate and drive the connected compressor 24. It is contemplated that turbines 32 may alternatively be disposed in a parallel relationship or that only a single turbine 32 may be included within exhaust system 16. It is also contemplated that turbines 32 may be omitted, if desired, and compressors 24 driven by power source 10 mechanically, hydraulically, electrically, or in any other manner known in the art.

EGR system 18 may include a means for redirecting a portion of the exhaust flow from exhaust system 16 into air induction system 14. For example, EGR system 18 may include an inlet port 40, a recirculation particulate filter 42, an exhaust cooler 44, a recirculation valve 46, and a discharge port 48. It is contemplated that EGR system 18 may include additional or different components, such as a catalyst, an electrostatic precipitation device, a shield gas system, one or more sensing elements, and/or other means for redirecting that are known in the art.

Inlet port 40 may be connected to exhaust system 16 to receive at least a portion of the exhaust flow from power source 10. Specifically, inlet port 40 may be disposed downstream of turbines 32 to receive low pressure exhaust gases from exhaust passageway 49. It is contemplated that inlet port 40 may alternatively be located upstream of turbines 32 for a high pressure recirculation application, if desired.

Recirculation particulate filter 42 may be connected to inlet port 40 via a fluid passageway 50 to remove particulates from the portion of the exhaust flow directed through inlet port 40. Recirculation particulate filter 42 may include electrically conductive or non-conductive coarse mesh elements. It is contemplated that recirculation particulate filter 42 may include a catalyst for reducing an ignition temperature of the particulate matter trapped by recirculation particulate filter 42, a means for regenerating the particulate matter trapped by recirculation particulate filter 42, or both a catalyst and a means for regenerating. The means for regenerating may include, among other things, a fuel-powered burner, an electrically-resistive heater, an engine control strategy, or any other means for regenerating known in the art. It is contemplated that recirculation particulate filter 42 may alternatively or additionally be located within passageway 49 or completely omitted, if desired.

Exhaust cooler 44 may be fluidly connected to recirculation particulate filter 42 via a passageway 52 to cool the portion of exhaust gases flowing through inlet port 40. Exhaust cooler 44 may include a liquid-to-air heat exchanger, an air-to-air heat exchanger, or any other type of heat exchanger known in the art for cooling an exhaust flow. It is contemplated that exhaust cooler 44 may be omitted, if desired.

Recirculation valve 46 may be fluidly connected to exhaust cooler 44 via a passageway 54 to regulate the flow of cooled exhaust entering air induction system 14. Recirculation valve 46 may embody a butterfly valve, a gate valve, a ball valve, a globe valve, or any other valve known in the art. Recirculation valve 46 may be solenoid-actuated, hydraulically-actuated, pneumatically-actuated, or actuated in any other manner.

Air induction system 14 may include a means for introducing cooled charge air or air mixed with exhaust into a combustion chamber 20 of power source 10. For example, air induction system 14 may include an induction valve 22, compressors 24, an air cooler 26, a condensation dispersion device 27, and an intake manifold 25. It is contemplated that additional components may be included within air induction system 14, such as, for example, additional valving, one or more air cleaners, one or more waste gates, a control system, and other means for introducing charge air into combustion chambers 20 that are known in the art.

Induction valve 22 may be fluidly connected to compressors 24 via a passageway 28 to regulate the flow of atmospheric air to power source 10. As atmospheric air enters induction valve 22, it may mix with the exhaust exiting discharge port 48, creating an exhaust and air mixture. Induction valve 22 may embody a butterfly valve, a gate valve, a ball valve, a globe valve, or any other type of valve known in the art. Induction valve 22 may be solenoid-actuated, hydraulically-actuated, pneumatically-actuated, or actuated in any other manner. It is contemplated that induction valve 22 and recirculation valve 46 may be combined into a single integral valve that performs the air and exhaust regulating and mixing functions, if desired.

Compressors 24 may compress the exhaust and air (or just air when recirculation valve 46 is closed) flowing into power source 10 to a predetermined pressure level. Compressors 24 may be disposed in a series relationship. Each of compressors 24 may include a fixed geometry compressor, a variable geometry compressor, or any other type of compressor known in the art. Compressors 24 may be fluidly connected to air cooler 26 via passageway 30 and may be disposed in a series relationship. It is contemplated that compressors 24 may alternatively be disposed in a parallel relationship or that air induction system 14 may include only a single compressor 24. It is further contemplated that compressors 24 may be omitted, when a non-pressurized induction system is desired.

Air cooler 26 may embody an air-to-air heat exchanger or an air-to-liquid heat exchanger and may facilitate the transfer of thermal energy to or from the exhaust and air mixture directed into power source 10. For example, air cooler 26 may include a shell and tube-type heat exchanger, a corrugated plate-type heat exchanger, a tube and fin-type heat exchanger, a bar-and-plate type heat exchanger, or any other type of heat exchanger known in the art. Air cooler 26 may be connected to condensation dispersion device 27 via fluid passageway 31. It is contemplated that air cooler 26 may alternatively be located upstream of compressors 24, and/or that air induction system 14 may include two or more coolers located upstream and/or downstream of compressors 24.

Figure 2:
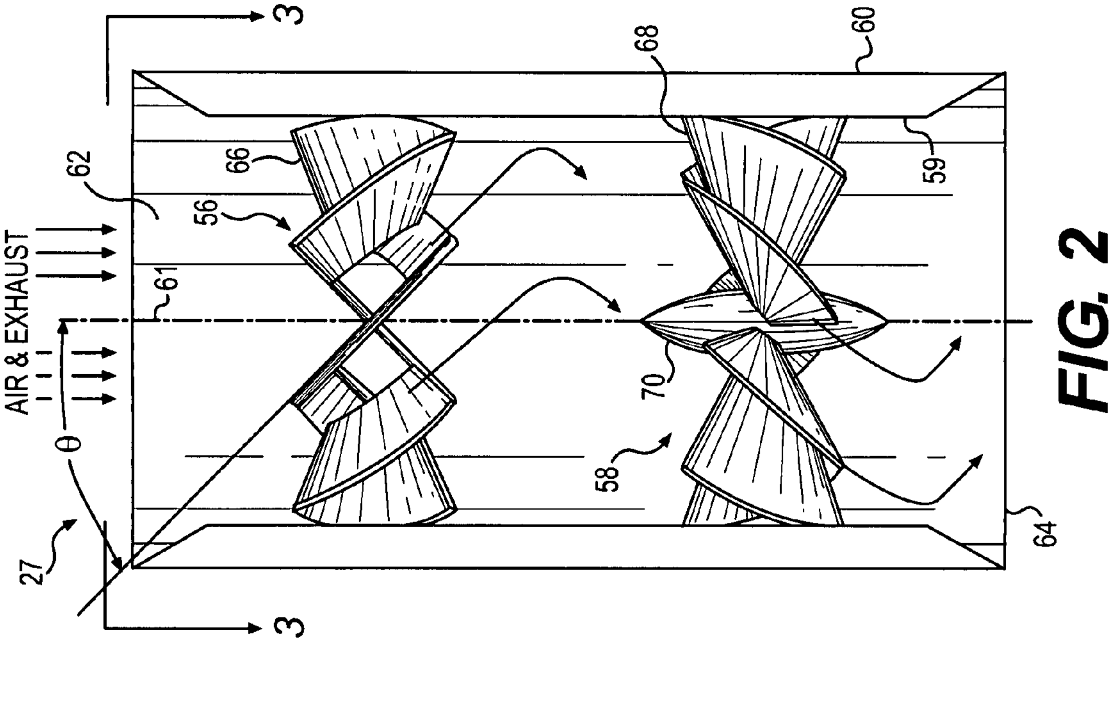
FIG. 2 is a cut-away pictorial illustration of an exemplary disclosed condensation dispersion device for use with the fluid handling system of FIG. 1.
Figure 4:
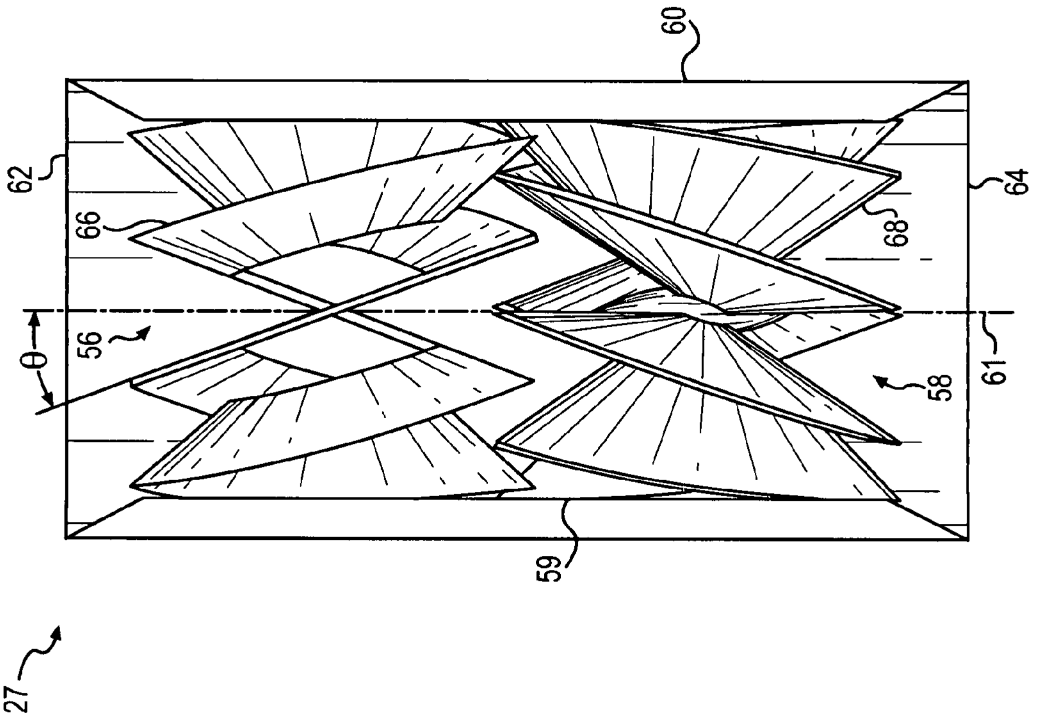
FIG. 4 is a cut-away pictorial illustration of another exemplary disclosed condensation dispersion device for use with the fluid handling system of FIG. 1.
Figure 5:
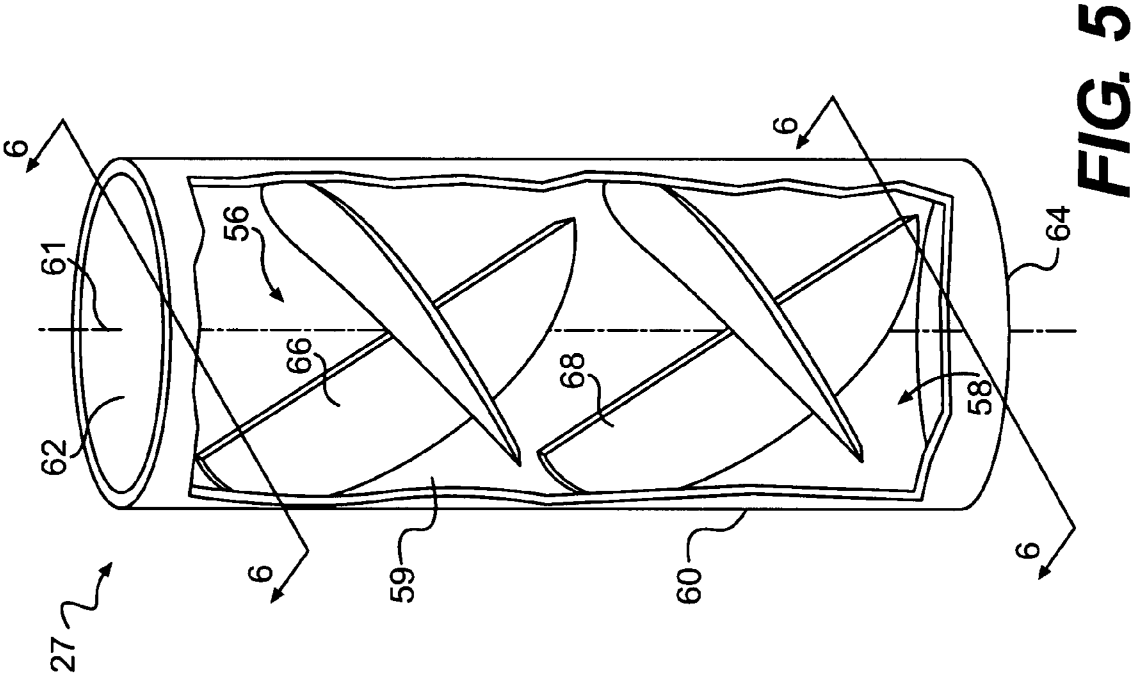
FIG. 5 is a cut-away pictorial illustration of another exemplary disclosed condensation dispersion device for use with the fluid handling system of FIG. 1.

As shown in FIGS. 2, 4, and 5 condensation dispersion device 27 may include a means for dispersing and re-entraining condensed fluid (e.g., water, sulfuric acid, nitric acid, etc.) into the charge air and exhaust flow before the fluid enters intake manifold 25 via passageway 33 (see FIG. 1). Condensation dispersion device 27 may include a housing 60 with an inlet 62 and an outlet 64. During operation of condensation dispersion device 27, the mixture of charge air and exhaust may enter inlet 62 and exit through outlet 64. Housing 60 may have any appropriate geometry, such as, for example, a cylindrical geometry. It is contemplated that housing 60 may be compact. For example, housing 60 may have a length to width ratio of about 4 to 1 or lower (e.g., 2 to 1). Housing 60 may contain a first static mixing device 56 and a second static mixing device 58 located in series relative to first static mixing device 56. It is contemplated that condensation dispersion device 27 may include additional stages of static mixing devices, if desired.

First static mixing device 56 may create a rotation and/or turbulence within the charge air and exhaust and redirect any condensate flowing along an internal wall 59 of housing 60 such that the condensate begins to revolatilize in the mixing air and exhaust. To achieve this redirection, first static mixing device 56 may have a first plurality of vanes 66. First vanes 66 may radially project inward from internal wall 59 toward a center of housing 60. Each first vane 66 may embody an essentially flat or slightly curved member that is oriented within housing 60 to cause the axially flowing charge air and exhaust to swirl or rotate in an annular direction about a central axis 61 of housing 60. This swirling of the charge air and exhaust may be created by angling or tilting each first vane 66 (e.g., by an angle $\theta$) away from the flow direction of the exhaust and air mixture. The angling or tilting of first vanes 66 may also redirect condensate from internal wall 59 toward the center of housing 60. It is contemplated that the number of first vanes 66 may be varied to optimize mixing, if desired.

Second static mixing device 58 may create further rotation and/or turbulence within the charge air and exhaust. Second static mixing device 58 may have a second plurality of vanes 68 extending from internal wall 59 toward the center of housing 60. Second vanes 68 may be connected to a hub 70 that is located at the center of housing 60 (hub 70 may be used to accelerate the flow as it passes through second static mixing device 58). Similar to first vanes 66, second vanes 68 may be angled or tilted (e.g., at same angle as first vanes 56) to create a desired rotation and/or turbulence in the charge air and exhaust flow. It is contemplated that the angle of first and second vanes 66 and 68 may be in a range of about 20 to 60 degrees. To create a larger amount of rotation and/or turbulence, each first vane 66 and second vane 68 may be angled a larger amount (as shown in FIG. 2), such as, for example, about 45 degrees. To create a smaller amount of rotation and/or turbulence, each first vane 66 and second vane 68 may be angled a smaller amount (as shown in FIG. 4), such as, for example, about 20 degrees. When a smaller angle is used, the length of each first vane 66 and second vane 68 may be increased to ensure that the axially flowing exhaust and air mixture, as well as the flowing condensate, contact and are redirected by first and second vanes 66 and 68. It is also contemplated that the angle of first vanes 66 may be different from the angle of second vanes 68, if desired.

To further atomize and revolatilize the condensate into the flow of exhaust and air, second vanes 68 may be angled in a direction opposite first vanes 66 (it is also contemplated that second vanes 68 may alternatively be oriented in the same direction as first vanes 66 as shown in FIG. 5, if desired). For example, first vanes 66 may be angled to create a counter-clockwise rotation of the charge air, exhaust, and flowing condensate in housing 60, and second vanes 68 may be angled to create a clockwise rotation. This redirection of the flowing condensate and charge air and exhaust's momentum may create impact at the second static mixing device 58 and enhance mixing and/or turbulence. The impact and increase in mixing and/or turbulence may further revolatilize the condensate into the exhaust and air flow. The rotation and turbulence created in the charge air and exhaust may also further atomize condensate particles that are already entrained in the exhaust and air flow.

Figure 3:
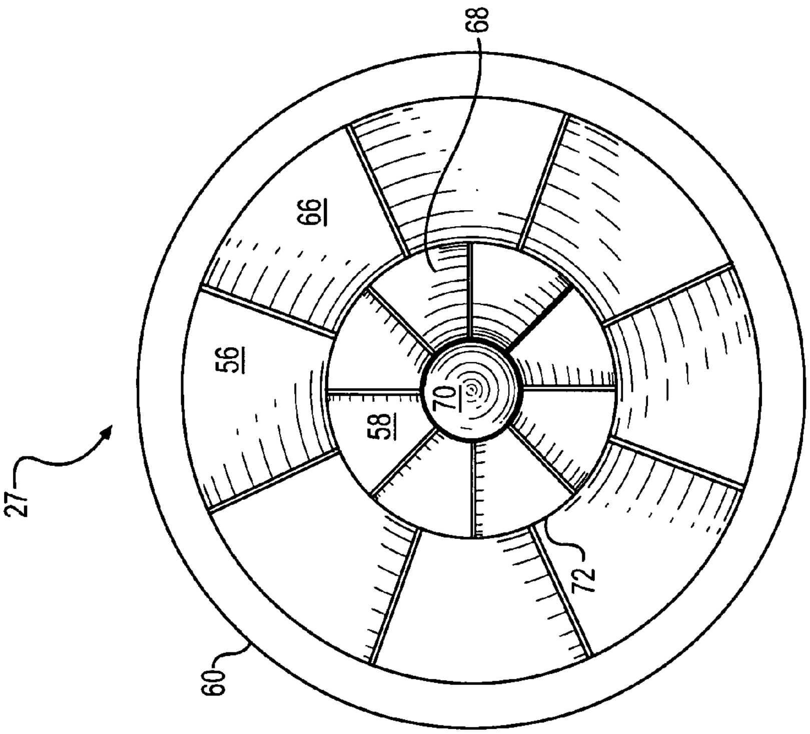
FIG. 3 is an axial view of the condensation dispersion device of FIG. 2.

As shown in FIG. 3, first static mixing device 56 may have a center cutout 72. Center cutout 72 may allow exhaust and air to flow through a center portion of first static mixing device 56 unimpeded, thus reducing backpressure. Backpressure may cause efficiency losses in condensation dispersion device 27. It is contemplated that second static mixing device 58 may additionally or alternatively have a center cutout 72.

Figure 6:
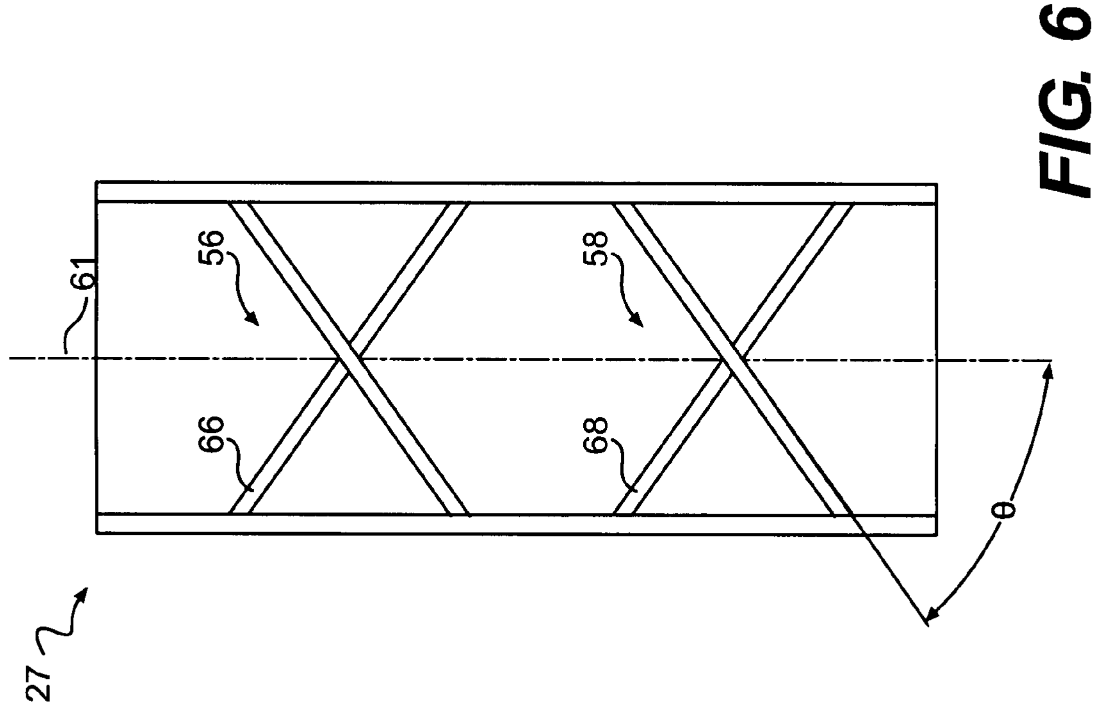
FIG. 6 is another cut-away pictorial illustration of the condensation dispersion device of FIG. 5.

FIGS. 5 and 6 illustrate an alternative embodiment of condensation dispersion device 27. In this embodiment each first and second vane 66 and 68 may be a generally flat semi-ellipsoid member that is tilted into the flow direction of the charge air and exhaust. The outer arc of each first vane 66 may fit flush with internal wall 59 of housing 60. In this embodiment, first static mixing device 56 may include two first vanes 66, and second static mixing devices 58 may include two second vanes 68.

In all embodiments described herein, it is considered that the size of center cutout 72, the axial distance between first static mixing device 56 and second static mixing device 58, the number of first and second vanes 66 and 68, and the angles of first and second vanes 66 and 68 may be optimized to re-entrain the maximum amount of condensate without significant detrimental backpressure in condensation dispersion device 27.

INDUSTRIAL APPLICABILITY

The disclosed fluid handling system may be applicable to any combustion device, such as an engine or a furnace, where mechanical and/or corrosive damage from condensate is a concern. The disclosed fluid handling system may re-entrain and revolatilize condensate into a flow of exhaust and/or air before the condensate enters the combustion device. The disclosed fluid handling system may provide a simple and inexpensive means for simultaneously decreasing system corrosion and engine wear while improving the engine's emission characteristics. Operation of the disclosed fluid handling system will now be described.

Referring to FIG. 1, atmospheric air may be drawn into air induction system 14 via induction valve 22 to compressors 24, where it may be pressurized to a predetermined level before entering combustion chambers 20 of power source 10. Fuel may be mixed with the pressurized air before or after entering combustion chambers 20. This fuel-air mixture may then be combusted by power source 10 to produce mechanical work and an exhaust flow containing gaseous compounds and solid particulate matter. The exhaust flow may be directed from power source 10 to turbines 32 where the expansion of hot exhaust gases may cause turbines 32 to rotate, thereby rotating connected compressors 24 to compress the inlet air. After exiting turbines 32, the exhaust flow may be divided into two flows, including a first flow redirected back to air induction system 14 and a second flow directed to the atmosphere.

As the first exhaust flow moves through inlet port 40 of EGR system 18, it may be filtered by recirculation particulate filter 42 to remove particulate matter prior to communication with exhaust cooler 44. The particulate matter, when deposited on the mesh elements of recirculation particulate filter 42, may be passively and/or actively regenerated. It is contemplated that the particulate matter may additionally or alternatively be filtered prior to entering inlet port 40, if desired.

The flow of the reduced-particulate exhaust from recirculation particulate filter 42 may be cooled by exhaust cooler 44 and then directed through recirculation valve 46 to be drawn back into air induction system 14 by compressors 24. The recirculated exhaust flow may then be mixed with the air entering combustion chambers 20. The exhaust, which is directed to combustion chambers 20, may reduce the concentration of oxygen therein, which in turn lowers the maximum combustion temperature within power source 10. The lowered maximum combustion temperature may slow the chemical reaction of the combustion process, thereby decreasing the formation of nitrogen oxides. In this manner, the gaseous pollution produced by power source 10 may be reduced.

Prior to entering power source 10, the mixture of exhaust and air may be cooled using exhaust cooler 44 and air cooler 26 so as to improve the longevity, performance, and emission characteristics of power source 10. As the mixture of inlet air and recirculated exhaust gases flows through air cooler 26 and the other passageways of air induction system 14, heat may be transferred from the higher temperature exhaust and air mixture to the lower temperature walls and/or cooling fluid. Since the vapor pressure of the mixture may decrease with decreasing temperature, vapor from the cooling mixture of exhaust and air may condense and begin to flow along the passageways of air induction system 14. This condensate may form corrosive substances. For example, sulfur dioxide and trioxide ($SO_2$ and $SO_3$) and nitrogen oxides ($NO_x$) in the exhaust may react with condensed water vapor and form sulfuric and nitric acid. The acidic condensate may eventually result in corrosion of air induction system 14 and power source 10. The condensate may also cause mechanical damage and enhanced wear when it reaches power source 10 and interacts with the power source's moving parts. However, a finely dispersed vapor or aerosol may cool the combustion process within power source 10 and thereby help to reduce the amount of $NO_x$ produced by power source 10.

Condensation dispersion device 27 may disperse and re-entrain condensed fluid into the air and exhaust mixture before the air and exhaust mixture enters power source 10. With reference to FIG. 2, the mixture of charge air and exhaust, as well as any flowing condensate, may enter inlet 62 of condensation dispersion device 27. When the flowing condensate and exhaust and air mixture reach first static mixing device 56, first vanes 66 of first static mixing device 56 may create a rotation and/or turbulence within the charge air and exhaust and redirect the condensate flowing along the interior walls of housing 60 toward the center of the mixing air and exhaust gas. The redirection of the condensate toward the center of the mixing and/or turbulent exhaust and air flow may, via changes in the pressure, temperature, velocity, and surface area of each condensate fluid particle, re-entrain the condensate into the gas flow. The degree of rotation and turbulence may depend on the angle of first vanes 66 away from the original flow direction. The mixture of charge air and exhaust, as well as condensate, may then be conducted by housing 60 to second static mixing device 58.

Second static mixing device 58 may further redirect, redisperse, and re-entrain the condensate into the charge air and exhaust. For example, first vanes 66 may be angled to create a counterclockwise rotation of the charge air, exhaust, and flowing condensate in housing 60, and second vanes 68 may be angled to create a clockwise rotation. This redirection of the flowing condensate, exhaust gas, and air's momentum may create impact at the second static mixing device 58 and further revolatilize the condensate into the air and exhaust gas. To improve the efficiency of condensation dispersion device 27, the air, exhaust gas, and entrained condensate particles may flow unimpeded through center cutout 72, thus reducing backpressure.

Several advantages of the disclosed fluid handling system may be realized. In particular, the disclosed condensation dispersion device may redisperse and re-entrain the corrosive condensate into the flow of exhaust and air prior to entering the associated engine. The redispersion of the condensate may prevent wear in the engine and corrosion in the disclosed air induction system downstream of the condensation dispersion device. Furthermore, the disclosed condensation dispersion device may improve the emission characteristics of the engine by redispersing the condensate into the flow of exhaust and air rather than removing it.

It will be apparent to those skilled in the art that various modifications and variations can be made to the disclosed fluid handling system. Other embodiments will be apparent to those skilled in the art from consideration of the specification and practice of the disclosed fluid handling system. For example, the disclosed condensation dispersion device could alternatively or additionally be located just downstream of the exhaust cooler to re-entrain exhaust condensate prior to mixing with air, if desired. It is intended that the specification and examples be considered as exemplary only, with a true scope being indicated by the following claims and their equivalents.

What is claimed is:

1. A method of re-dispersing condensate, comprising:
- generating a flow of exhaust with a power source;
- mixing the flow of exhaust with air;
- cooling the flow of exhaust and air;
- conducting the cooled flow of exhaust and air through a housing; and
- redirecting condensate from the cooled exhaust from an internal wall of the housing back into the flow of exhaust with a static mixing device including a plurality of mixing vanes extending from the internal wall inward toward a center of the housing such that the condensate is dispersed into the flow of exhaust prior to combustion of the cooled flow of exhaust.

2. The method of claim 1, further including generating a swirl in the flow of exhaust and air.

3. The method of claim 1, further including allowing a center portion of the flow of exhaust and air to pass unrestricted.

4. The method of claim 1, wherein the static mixing device is located upstream of the power source but downstream of a turbocharger compressor.

5. A condensation dispersion device, comprising:
- a housing having an inlet configured to receive an air and exhaust mixture, and an outlet configured to discharge the air and exhaust mixture;
- a first static mixing device, the first static mixing device being disposed within the housing and being configured with a plurality of mixing vanes extending from an internal wall inward toward a center of the housing to redirect condensate from the internal wall of the housing into the air and exhaust mixture; and
- a second static mixing device located downstream of the first static mixing device to further redirect condensate into the air and exhaust mixture,
  - wherein at least one of the first static mixing device or the second static mixing device includes a central opening extending through the at least one static mixing device.

6. The condensation dispersion device of claim 5, wherein:
- the second static mixing device includes a second plurality of mixing vanes; and
- the second plurality of mixing vanes extend from the internal wall inward toward the center of the housing.

7. The condensation dispersion device of claim 6, wherein the first and second plurality of mixing vanes are tilted in a flow direction of the air and exhaust mixture.

8. The condensation dispersion device of claim 7, wherein the first and second plurality of mixing vanes are tilted at an angle between about 20 and 60 degrees.

9. The condensation dispersion device of claim 8, wherein the first and second plurality of mixing vanes are tilted at about 45 degrees.

10. The condensation dispersion device of claim 6, wherein the first plurality of mixing vanes are oriented in a first direction, and the second plurality of mixing vanes are oriented in the same direction.

11. The condensation dispersion device of claim 6, wherein the first plurality of mixing vanes are oriented in a first direction, and the second plurality of mixing vanes are oriented in a second direction opposite the first direction.

12. The condensation dispersion device of claim 6, wherein the first static mixing device includes the central opening.

13. The condensation dispersion device of claim 6, wherein an impact of the condensate with the second plurality of mixing vanes atomizes the condensate.

14. The condensation dispersion device of claim 6, wherein the second plurality of mixing vanes are connected to a central hub.

15. The condensation dispersion device of claim 14, wherein the central hub is substantially ellipsoidal in shape.

16. The condensation dispersion device of claim 5, wherein the first static mixing device is configured to cause the mixture of air and exhaust to swirl.

17. The condensation dispersion device of claim 5, wherein the central opening is circular.

18. The condensation dispersion device of claim 5, wherein the first static mixing device and the second static mixing device are coaxial.

19. A fluid handling system, comprising:

a power source configured to produce a mechanical power output and a flow of exhaust;

an exhaust passageway fluidly coupled to direct exhaust from the power source toward the atmosphere;

an induction passageway configured to direct air to the power source;

a recirculation passageway configured to direct exhaust from the exhaust passageway into the induction passageway;

a cooler disposed in fluid communication with the induction passageway to cool an air and exhaust mixture directed to the power source; and a condensation dispersion device located within the induction passageway between the cooler and the power source, the condensation dispersion device being configured to redirect condensate from the cooled air and exhaust mixture back into the cooled air and exhaust mixture at a location upstream of the power source, wherein the condensation dispersion device includes:

a housing having an inlet configured to receive the cooled air and exhaust mixture, and an outlet configured to discharge the cooled air and exhaust mixture;

a first static mixing device disposed within the housing and being configured with a first plurality of mixing vanes extending from an internal wall inward toward a center of the housing to redirect condensate from the internal wall of the housing into the cooled air and exhaust mixture, wherein the first static mixing device includes a central opening through the first plurality of mixing vanes; and a second static mixing device disposed within the housing and being configured to further redirect and reentrain condensate into the cooled air and exhaust mixture, wherein the second static mixing device includes a second plurality of mixing vanes that extend from the internal wall inward toward a central hub.

20. The condensation dispersion device of claim 19, wherein the condensation dispersion device is located upstream of the power source but downstream of a turbocharger compressor.

* * * * *